(No Model.)

T. UTLEY.
FITTINGS FOR CARRYING CATTLE ON VESSELS.

No. 286,976. Patented Oct. 16, 1883.

Witnesses
J. E. Maynadier
John R. Snow

Inventor.
Thomas Utley

UNITED STATES PATENT OFFICE.

THOMAS UTLEY, OF BOSTON, MASSACHUSETTS.

FITTINGS FOR CARRYING CATTLE ON VESSELS.

SPECIFICATION forming part of Letters Patent No. 286,976, dated October 16, 1883.

Application filed April 2, 1881. (No model.) Patented in England April 18, 1881, No. 1,687.

*To all whom it may concern:*

Be it known that I, THOMAS UTLEY, a subject of the Queen of Great Britain, now residing in Boston, in the county of Suffolk and State of Massachusetts, have invented a new and useful Improvement in Fittings for Carrying Cattle on Vessels, (for which I have obtained a patent in Great Britain, No. 1,687, bearing date April 18, 1881,) of which the following is a full, clear, concise, and exact description, reference being had to the accompanying drawings, which form a part hereof.

Much difficulty has been experienced in transporting cattle and other animals, especially on sea-going steamships, by reason of the listing of the vessel, which often subjects cattle to severe and fatal injuries. It has been found that all animals can readily adapt themselves to the ordinary motions of the ship if they stand on a level, or with their fore-shoulders slightly higher than their buttocks, but when their buttocks are higher than their fore shoulders (as the cattle on the starboard side will be when the ship lists to port) they are unable long to suit themselves to the motion of the vessel, and are in great danger of serious or fatal injuries.

My invention is designed to remedy this difficulty; and it consists in a stall the floor of which can be kept in the best position to enable the cattle to adapt themselves to the ordinary motions of the vessel.

Figure 1:
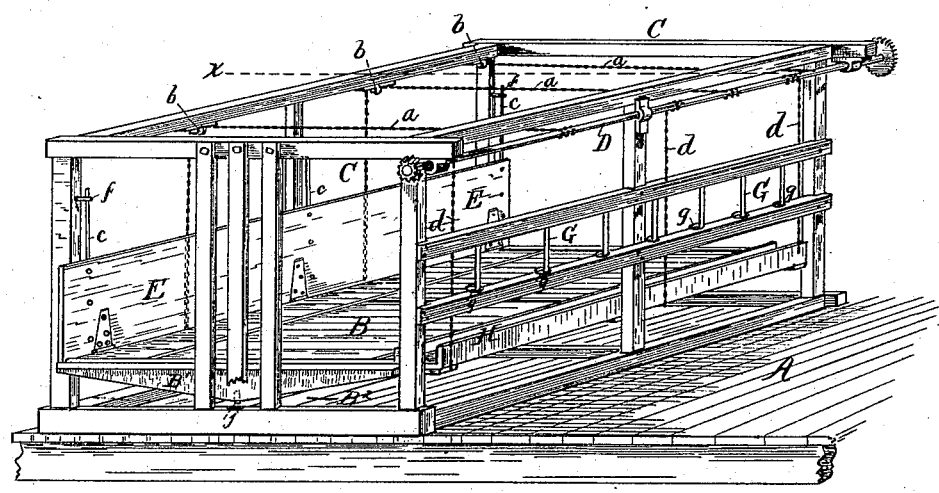
Figure 2:
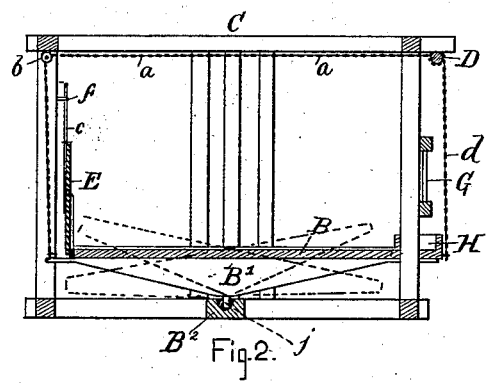

In the drawings, Figure 1 is a perspective showing apparatus embodying my invention. Fig. 2 is a transverse section on line $x$ $x$ of Fig. 1.

A is the deck of the vessel, B the floor, and C C the frame of the stall. B' are beams, shaped as shown, upon which the floor B is secured. These beams are supported at their thick middle portions on a cross-beam, $B^2$, and are prevented from sliding on that cross-beam by a pin, $j$, which projects into a suitable depression. In the drawings the pins J are fast to beams B' and project into beams $B^2$. A are chains, which run over pulleys $b$ and around shaft D. One end of these chains is attached to shaft D, and the other end fastened to the floor B, behind the back board, E. The chains $d$ are also attached to the shaft D, at one end, and their other ends are fastened to the floor B, on the front side. The back board, E, is attached to the floor B, preferably by hinges, or by other similar means, so that while the floor oscillates the back board, E, can move with it, guided by the supporting-rods $c$ $c$, which slide in the rings $f$. H is the watering and feeding trough; G, the stanchions. The cattle are fastened to the rings $g$, which slide freely on the stanchions G. The beams B' are arranged at suitable intervals along the under side of the floor B.

These stalls are generally arranged one line on each side of the vessel, the animals facing inward; but sometimes three or four lines in a wide vessel.

The operation is as follows: When the vessel lists to port, the animals on the starboard will stand with their fore shoulders lower than the ordinary and natural position, and their buttocks too high. The floor B is then moved on the beams by shaft D and chains $a$ $d$ until it is canted sufficiently to bring the animals in the proper position. For example, suppose the ship to be on an even keel, but laboring heavily in a gale, and suppose there to be but two lines of stalls, then both lines of stalls will have their floors adjusted so that the cattle on both port and starboard will stand with their heads well up, the floors of both stalls sloping outward. Then, when the ship rolls to port the port cattle will stand with their heads still higher up, and the starboard cattle will stand on a level, and vice versa.

In case of a constant list, if the list be to port, the starboard stalls will have the inboard side of its floor higher than the outboard side; and if the list be great the floors of port stalls will also be adjusted by slightly lowering the inboard side and raising the outboard side.

What I claim as my invention is—

1. The stall for carrying cattle on vessels, having the floor B, supported on beams B', adapted to tilt, and means, substantially as described, for tilting these beams to adjust the floor, as and for the purposes set forth.

2. In combination with the frame C C, the floor B, beams B', chains $a$ $d$, and shaft D, arranged and operating substantially as and for the purposes set forth.

3. In combination with the floor of a stall and the devices, substantially as described, for tilting it, the back board, E, hinged to the floor, and provided with guides, as and for the purposes set forth.

THOMAS UTLEY.

Witnesses:
J. E. MAYNADIER,
J. R. SNOW.